US007320000B2

(12) United States Patent
Chitrapura et al.

(10) Patent No.: US 7,320,000 B2
(45) Date of Patent: Jan. 15, 2008

(54) METHOD AND APPARATUS FOR POPULATING A PREDEFINED CONCEPT HIERARCHY OR OTHER HIERARCHICAL SET OF CLASSIFIED DATA ITEMS BY MINIMIZING SYSTEM ENTROPY

(75) Inventors: Krishna Prasad Chitrapura, New Delhi (IN); Raghuram Krishnapuram, New Delhi (IN); Sachindra Joshi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 10/309,612

(22) Filed: Dec. 4, 2002

(65) Prior Publication Data

US 2004/0111438 A1 Jun. 10, 2004

(51) Int. Cl.
G06F 7/10 (2006.01)
(52) U.S. Cl. ......................................................... 707/7
(58) Field of Classification Search .................... 707/6, 707/104.1, 200, 1, 7; 706/20, 59, 14
See application file for complete search history.

(56) References Cited

U.S. PATENT DOCUMENTS

| | | | | |
|---|---|---|---|---|
| 4,975,975 A | * | 12/1990 | Filipski | 382/227 |
| 5,649,070 A | * | 7/1997 | Connell et al. | 706/14 |
| 5,652,829 A | * | 7/1997 | Hong | 706/59 |
| 5,864,839 A | * | 1/1999 | Bourgoin | 707/1 |
| 6,233,575 B1 | | 5/2001 | Agrawal et al. | |

OTHER PUBLICATIONS

Safavian, S. Rasoul and David A. Landgrebe, "A Survey of Decision Tree Classifier Methodology," IEEE Transactions on Systems, Man, and Cybernetics, IEEE Transactions on Systems, Man, and Cybernetics, vol. 21, No. 3, pp. 660-674, May 1991.*

K Nigam, J Lafferty, A McCallum, Using maximum entropy for text classification, In IJCAI-99 Workshop on Machine Learning for Information Filtering, pp. 61-67, 1999.*

Tom Mitchell, Machine Learning, pp. 54, 182-183, 191-198, McGraw Hill 1997.

(Continued)

*Primary Examiner*—Paul Rodriguez
*Assistant Examiner*—Luke Osborne
(74) *Attorney, Agent, or Firm*—Gibb & Rahman, LLC (57) ABSTRACT

A system and method for automated populating of an existing concept hierarchy of items with new items, using entropy as a measure of the correctness of a potential classification. User-defined concept hierarchies include, for example, document hierarchies such as directories for the Internet, library catalogues, patent databases and journals, and product hierarchies. These concept hierarchies can be huge and are usually maintained manually. An internet directory may have, for example, millions of Web sites, thousands of editors and hundreds of thousands of different categories. The method for populating a concept hierarchy includes calculating conditional 'entropy' values representing the randomness of distribution of classification attributes for the hierarchical set of classes if a new item is added to specific classes of the hierarchy and then selecting whichever class has the minimum randomness of distribution when calculated as a condition of insertion of the new data item.

23 Claims, 6 Drawing Sheets

OTHER PUBLICATIONS

Andrew McCallum, Kamal Nigam, "A Comparison of Event Models for Naive Bayes Text Classification" in AAAI/ICML-98 Workshop on Learning for Text Categorization. Technical Report WS-98-05, AAAI Press, 1998.

Kamal Nigam, John Lafferty, Andrew McCallum, "Using Maximum Entropy for Text Classification" in IAJC1-99 Workshop on Machine Learning for Information Filtering, 1999.

C.E. Shannon, "A mathematically theory of communication," Bell System Technical Journal, vol. 27, pp. 379-423 and 623-656, Jul. and Oct. 1948.

David Feldman, "A Brief Introduction to: Information Theory, Excess Entropy and Computational Mechanics", Apr. 1998, University of California, Davis CA, USA.

* cited by examiner

INPUT: root of the concept hierarchy, pre-populated with training set of items.

Entropy(*root*)
{
  $H[root]=0$
  If(*root* ≠LEAF)
    For (all *ch* which is a child of *root*)
$$H[root] = H[root] - \Pr(ch)\log \Pr(ch) - \sum_{f \in D} \Pr(ch) \Pr(f|ch)\log \Pr(f|ch) + \Pr(ch).Entropy(ch)$$
  return $H[root]$
}

OUTPUT: $H[C_i]$ for all the nodes $C_i$ in concept hierarchy over all the features in the dictionary. This is infact $H[C_i,F]$.

INPUT: A trained concept hierarchy and a new item $d$ to be inserted in the concept hierarchy. Let $\Gamma$ be some user defined threshold.

Insert(*root*,*d*)
{
  If(*root* = LEAF)
    Insert *d* into *root*
  Else
  {
    For (all *ch* which is a child of *root*)
    {
      Insert *d* temporarily in *ch*
      Compute $H[root][ch]$ using pre-computed entropies of child nodes
$$H[root][ch] = \sum_{\sigma \in \zeta_{max}} \Pr(c)\log \Pr(c) - \sum_{\sigma \in \zeta_{max}} \sum_{f \in D} \Pr(c)\Pr(f|c)\log \Pr(f|c) + \sum_{\sigma \in \zeta_{max}} \Pr(c).H[c]$$
      Remove *d* from *ch*
    }
    *Current_Node* = min($H[root][ch]$)
    Let *Second_Node* be the node with second minimum entropy.
    If (($H[Second\_Node]$) - ($H[Current\_Node]$) $\leq \Gamma$)
      Insert *d* into *Current_Node*
    Else
      Insert(*Current_Node*,*d*)
  }
}

OUTPUT: Concept hierarchy with the new item $d$ inserted.

METHOD AND APPARATUS FOR POPULATING A PREDEFINED CONCEPT HIERARCHY OR OTHER HIERARCHICAL SET OF CLASSIFIED DATA ITEMS BY MINIMIZING SYSTEM ENTROPHY

FIELD OF INVENTION

The present invention relates generally to methods, apparatus and computer program products in the field of data processing, and more particularly to information retrieval and classification.

BACKGROUND

Classification is the process by which every item in a set of items is assigned a unique class label from a predefined set of class labels. Items could be any real life entities such as documents, people, products, etc., which can be modeled as having a fixed set of attributes or features. In this document, this fixed set of features is referred to as the dictionary. The labels could be any meaningful abstraction for the entity being classified. For example {rich, poor} could be the set of class labels for the entity 'person'.

Algorithms for supervised classification (as defined in the book 'Machine Learning', Tom Mitchell, 1997, McGraw Hill, pp. 54, 182-183, 191-198) have been used in a variety of fields where the similarity between the items to be classified can be inferred from a classified example set. These classification algorithms learn to map the features of the already given examples to the corresponding classes and classify new items based on the learned mapping.

The naïve Bayesian approach is a widely used supervised classification algorithm. The naïve Bayesian approach assumes that the features which represent the items occur independent of each other. Two different naïve Bayesian models used in practice are the multi-variate Bernoulli model and the multinomial model. The multi-variate Bernoulli model uses a binary vector representation for an item where a "1" denotes the presence of a feature and "0", the absence. The mulitnomial model uses the frequency of occurrence of a feature in a class for probability calculations. For the classification of a new item, both models calculate the posterior probability that a class would have generated the given item.

A study showing that the multinomial model typically outperforms the multi-variate Bernoulli model is presented by Andrew McCallum & Kamal Nigam in "A Comparison of Event Models for Naive Bayes Text Classification" in AAAI/ICML-98, Workshop on Learning for Text Categorization, Technical Report WS-98-05, AAAI Press, 1998.

Entropy is a measure of the state of randomness of distribution within a system, and has been used to model data items outside of the field of thermodynamics. See, for example, C. E. Shannon, "A mathematical theory of communication", Bell System Technical Journal, vol. 27, pp. 379-423 and 623-656, July and October, 1948. (At the time of writing, a reprint version of this paper is available from the Website at 'cm.bell-labs.com/cm/ms/what/shannonday/shannon1948.ps.gz'). Background information can also be found in David Feldman, "A Brief Introduction to: Information Theory, Excess Entropy and Computational Mechanics", April 1998, University of California, Davis Calif., U.S.A.

Entropy has also been used for classification. Any change in the state of a system has a resulting effect on its entropy, and it has been suggested that entropy calculations can be used to model the distribution of a variable in the field of text classification. The underlying principle of these probability distribution estimation techniques is that, in the absence of any external knowledge, one should prefer a uniform distribution that correspond to maximum entropy.

The technique described in Kamal Nigam, John Lafferty, Andrew McCallum, "Using Maximum Entropy for Text Classification", IAJCI-99, Workshop on Machine Learning for Information Filtering, 1999, uses a labeled training set of documents to establish a set of constraints for the model. These constraints characterize the class-specific expectations for the distribution. Using the concept of maximum entropy and these constraints for a given document, the technique of Nigam et al estimates the conditional probability distribution of the classes and classifies the document using iterative scaling algorithms. The experiments on several text data sets done by Nigam, Lafferty and McCallum show that the performance of maximum entropy is sometimes better but also sometimes worse than naive Bayesian classification. This technique is also sensitive to feature selection and can perform badly in case of poor feature selection.

Many of the classification methods disclosed in published literature are for assigning class labels to a set of data items, and are not specifically designed for populating an existing concept hierarchy. Concept hierarchies can be visualized as tree structures where a child to parent relationship is a fixed and well-defined one. For example, "cars" and "trucks" are children of "vehicle". Generally "IS-A" or "A-Kind-Of" relationships are maintained, where child is a kind of parent. Each node in a concept hierarchy has a label whose prefix is the label of its parent. Sibling classes are the set of classes at a single level of the hierarchy which have a common parent (i.e. are immediate descendants of a common ancestor node at the next level in the hierarchy). Concept hierarchies have a special node (root node) which is the ancestor of any node in the hierarchy. In this document, data items within the hierarchy are described using the example of documents within an hierarchical set of document classes, and so any reference to 'documents' hereafter can be generalized to any data items including any type of media.

U.S. Pat. No. 6,233,575 (issued to Agrawal et al on May 15, 2001) describes a system and process for organizing a large text database into a hierarchy of topics and for maintaining this organization as documents are added and deleted and as the topic hierarchy changes. Given sample documents belonging to various nodes in the topic hierarchy, the tokens (terms, phrases, dates, or other usable feature in the document) that are most useful at each internal decision node for the purpose of routing new documents to the children of that node are automatically detected. Using feature terms, statistical models are constructed for each topic node. The models are used in an estimation technique to assign topic paths to new unlabeled documents. U.S. Pat. No. 6,233,575 does not classify documents using entropy.

Populating hierarchical taxonomies has become an important problem in maintaining product catalogues, knowledge bases, etc. Currently, most concept hierarchies are still manually maintained.

There is a need in the art for a solution for populating an hierarchically organized set of classified data items with new data items, which at least mitigates one or more problems inherent in known classification methods. There is also a need for a solution for determining the degree of confidence in the classification of data items within a set of hierarchically organized classified data items.

SUMMARY

Disclosed are a system, an automated classifier, a computer program product and a method for populating a concept hierarchy or another hierarchically organized set of classified data items, while minimizing a calculated 'entropy' of the classification attributes of data items within the hierarchy. Entropy characterizes the state of a system in terms of the randomness of distribution of a variable of the system—in this case the distribution of classification attributes of data items within the hierarchy. The approach described herein can be used for populating any concept hierarchy by inserting new data items into an appropriate class in the hierarchy, where the items to be classified can be defined using a set of classification attributes. The approach can also be used for estimating the confidence in classifications of data items.

A first aspect of the invention provides a method for automating classification of a new data item when adding the new data item to an hierarchically organized set of classified data items, wherein nodes of the hierarchy correspond to classes of data items, the method comprising: for a new data item requiring classification within the set of classified data items, identifying classification attributes of the new data item by reference to a set of classification attributes for the set of classified data items; calculating a conditional value representative of the randomness of distribution of classification attributes for data items within the set of classified data items, which value is conditional on the new data item being added to a first class at a particular level of the hierarchy, and repeating the step of calculating a conditional value for each sibling class of the first class at said particular level of the hierarchy wherein said conditional values are each conditional on adding the new data item to a different respective one of said sibling classes at said particular level of the hierarchy; comparing the conditional values to identify the lowest conditional value; and selecting the class having the lowest conditional value for classifying the new data item.

The method preferably includes a preliminary step of creating a dictionary of classification attributes for the set of classified data items, by identifying and storing a set of attributes or features of data items which are useful for classification, together with a set of class labels. Then each new data item may be classified by reference to classification attributes of the data item.

In a preferred embodiment, the classification attributes used for classifying a new document are the subset of the words within the document that are found in the dictionary. The total set of classification attributes are the words in the dictionary and the set of class labels of the classification hierarchy. The randomness of distribution of class labels can be measured across the set of classes, and the randomness of distribution of words can be calculated across classes or within a class of documents.

Methods according to a preferred embodiment of the invention include a training phase during which the distribution of classification attributes within the concept hierarchy is modelled, firstly by identifying or extracting from data items in the concept hierarchy a set of classification attributes (consisting of the 'dictionary' or 'vocabulary' and a set of class labels) which are useful for classification, and then calculating an initial value representative of the entropy, or randomness of distribution, of classification attributes across the classes of data items within the classified set of data items. Once the system is trained, the entropy of the given structure is minimized while inserting new items.

In a preferred method according to the invention, the calculations to determine an appropriate classification of a new data item start with a concept hierarchy already populated with an example set of data items. Any new item to be classified is inserted in the specific class of the hierarchical set of classes which would result in minimum entropy (minimum randomness of distribution of classification attributes) of the concept hierarchy following the insertion. The calculations can be simplified by relying on knowledge of which classes of the concept hierarchy have their entropy unaffected by addition of the data item.

A second aspect of the invention provides an automated classifier of data items which applies the principle of selecting a class for classifying each new data item according to which class maintains minimal entropy of the hierarchy of classes of data items. That is, a new data item is inserted in the class that gives rise to the maximum decrease or minimum increase in the entopy of the hierarchically organized set of data items. Such a classifier can be applied to populate concept hierarchies such as an Internet directory (for example, Yahoo!), library catalogues, product catalogues and other predefined concept hierarchies.

Preferred methods and automated classifiers for selecting a classification class start from the root node of the hierarchy and find, at each subsequent level of the existing concept hierarchy, an appropriate node for inserting the new item. At each level, the node that results in the minimal entropy is selected, and this procedure is then repeated for child nodes. This process does not guarantee an overall minimum change in the state of the concept hierarchy. However, methods implementing the invention have been shown to classify data items quickly and to perform well in practice.

The methods according to the preferred embodiment therefore include performing, for each class within the set of immediate descendant ('child') classes of a selected class, the step of calculating conditional values, and performing the steps of identifying the lowest conditional value from the set of child classes and selecting the child class having the lowest conditional value for classifying the new data item. These steps can be repeated until the selected class is at a leaf node of the hierarchy, in which case the data item is classified within the selected leaf node class.

In an alternative embodiment, the classification process may end at an intermediate node instead of a leaf node. In one such embodiment, a threshold value is set for the system. When calculated conditional values for sibling classes are compared, if the difference between the two best (lowest) conditional values at a level of the hierarchy is smaller than the threshold, then classification can stop at the parent class, or the system can be configured to seek human intervention to select one of the sibling classes. Generalizing this example implementation, the classification process selects the parent class if n of its immediate child nodes have similar entropy values where n may take any value from 2 to the number of child nodes of the parent node.

Other embodiments identify a situation in which the total entropy of the system is lower when the new data item is classified at a parent node than if the data item is classified at any of the children, and then either the parent node is selected or a new child node is created.

In an alternative embodiment, a new subclass is created at the parent node for classifying a data item if the initial entropy value is lower than the conditional entropy value by more than a predefined threshold. The new data item is then classified under this sub-class. Methods according to the invention preferably involve modelling the state of the hierarchical set of classes using a measure of the randomness of distribution of classification attributes across the set of classes and within classes, and then calculating conditional changes to this state resulting from classifying a new data item in each potentially suitable class. The new data item is classified using the class for which addition of the data item minimizes the randomness of distribution of classification attributes for the hierarchical set of classes.

According to another aspect of the invention, there is provided an apparatus for implementing any one of the methods described above.

According to another aspect of the invention there is provided a computer program product including a computer readable medium having recorded thereon a computer program for implementing any one of the methods described above.

Other aspects of the invention are also disclosed.

BRIEF DESCRIPTION OF DRAWINGS

Preferred embodiments of the invention are described in more detail hereafter, by way of example only, with reference to the accompanying drawings in which.

DETAILED DESCRIPTION OF PREFERRED EMBODIMENTS

Figure 1:
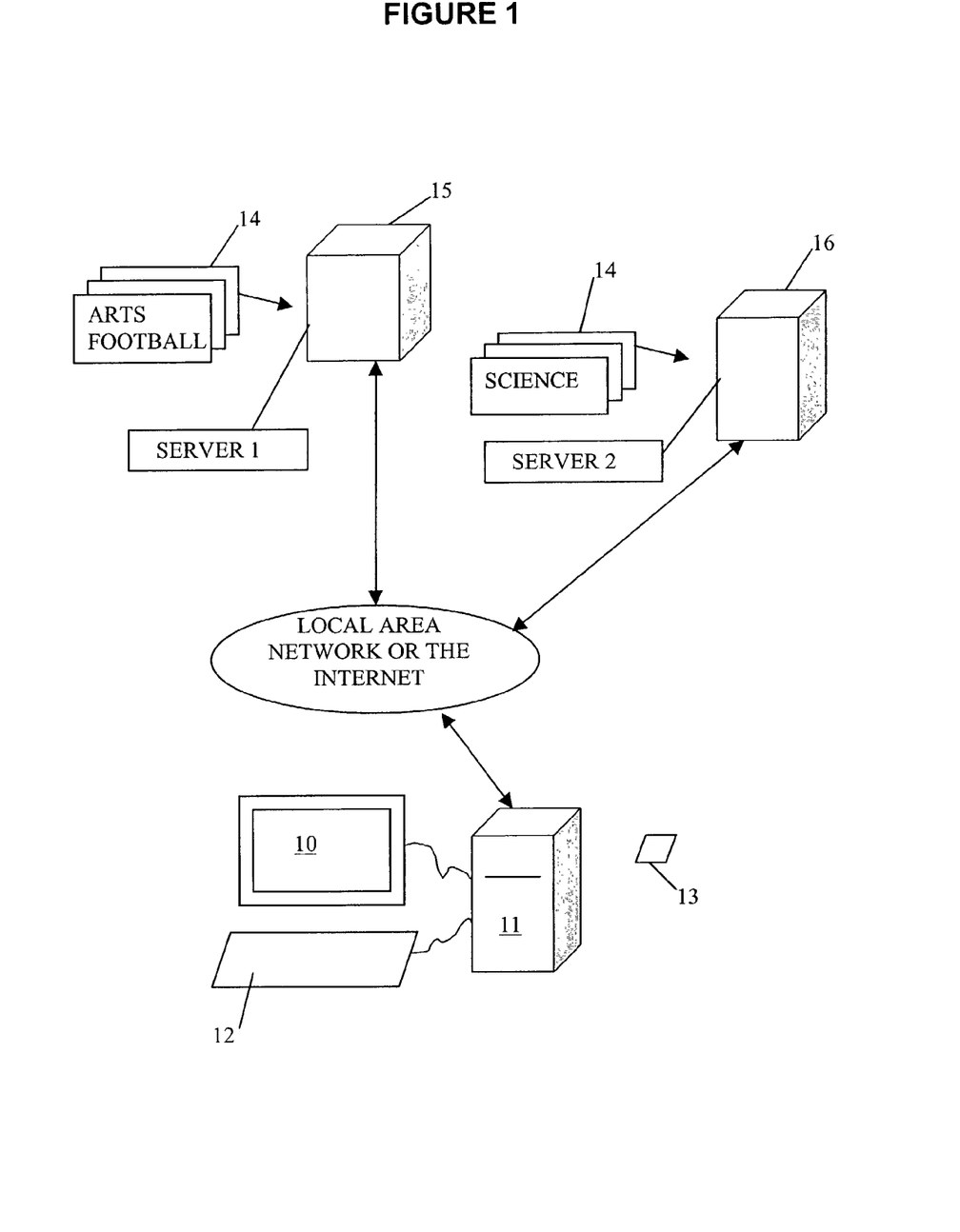
FIG. 1 is a schematic representation of a hardware environment in which a preferred embodiment of the present invention may be employed.

An example hardware environment for a network embodiment is shown in FIG. 1, which includes a user computer 11, a user display 10, and a user interface 12. The display 10 is preferably a visual display device, such as a cathode ray tube monitor, a liquid crystal monitor or other suitable display device. The user interface 12 preferably comprises one or more of a key board, mouse, touch-screen device or other suitable input device. The computer 11 operates in accordance with a software program stored on a computer readable medium, such as a floppy disk 13, hard disk (not shown) or other suitable storage medium.

The computer 11 is linked to other computers, through an internet connection, and operates in accordance with a suitable software program to access information items 14 stored in at least one information database. In the illustrated embodiment, the information items 14 comprise text documents stored or accessible through one or more server computers 15, 16. For example, with reference to FIG. 1, a set of text documents on a variety of topics are stored or accessible through the Server 1 location, and a further set of text documents on a variety of topics are stored or accessible through the Server 2 location. Further, server locations (not shown) may store or provide access to additional documents.

As described in further detail herein, preferred embodiments of the present invention include a system comprising a computer which operates in accordance with a process stored as a program on a computer readable medium, to organize and classify information items and to enable retrieval of those items.

Some portions of the following description are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, it will be appreciated that throughout the present specification, discussions utilising terms such as "computing", "calculating", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialised apparatus to perform the required method steps may be appropriate. For example, an Internet Directory Server computer may be configured to populate a directory stored thereon by installing computer programs for performing the calculations, comparisons and selection steps described below.

In addition, the present specification also discloses a computer readable medium comprising a computer program for performing the operations of the methods. The computer readable medium is taken herein to include any transmission medium for communicating the computer program between a source and a destination. The transmission medium may include storage devices such as magnetic or optical disks, memory chips, or other storage devices suitable for interfacing with a general purpose computer. The transmission medium may also include a hard-wired medium such as exemplified in the Internet system, or wireless medium such as exemplified in the GSM mobile telephone system. The computer program is not intended to be limited to any particular programming language and implementation thereof. It will be appreciated that a variety of programming languages and coding thereof may be used to implement the teachings of the disclosure contained herein.

Where reference is made in any one or more of the accompanying drawings to steps and/or features, which have the same reference numerals, those steps and/or features have for the purposes of this description the same function(s) or operation(s), unless the contrary intention appears.

The principles of the preferred method described herein have general applicability to classification of data for storage and retrieval. However, for ease of explanation, the steps of the preferred method are described with reference to classification of new documents within a set of documents classified within a concept hierarchy or "taxonomy". However, the present invention is not limited to the described method. For example, the invention may have applicability to any hierarchically organized data where attributes or features of the data items within the hierarchy can be represented as random variables such that their distribution can be measured and the randomness of the distribution can be compared for different potential classifications of a new data item.

Figure 2:
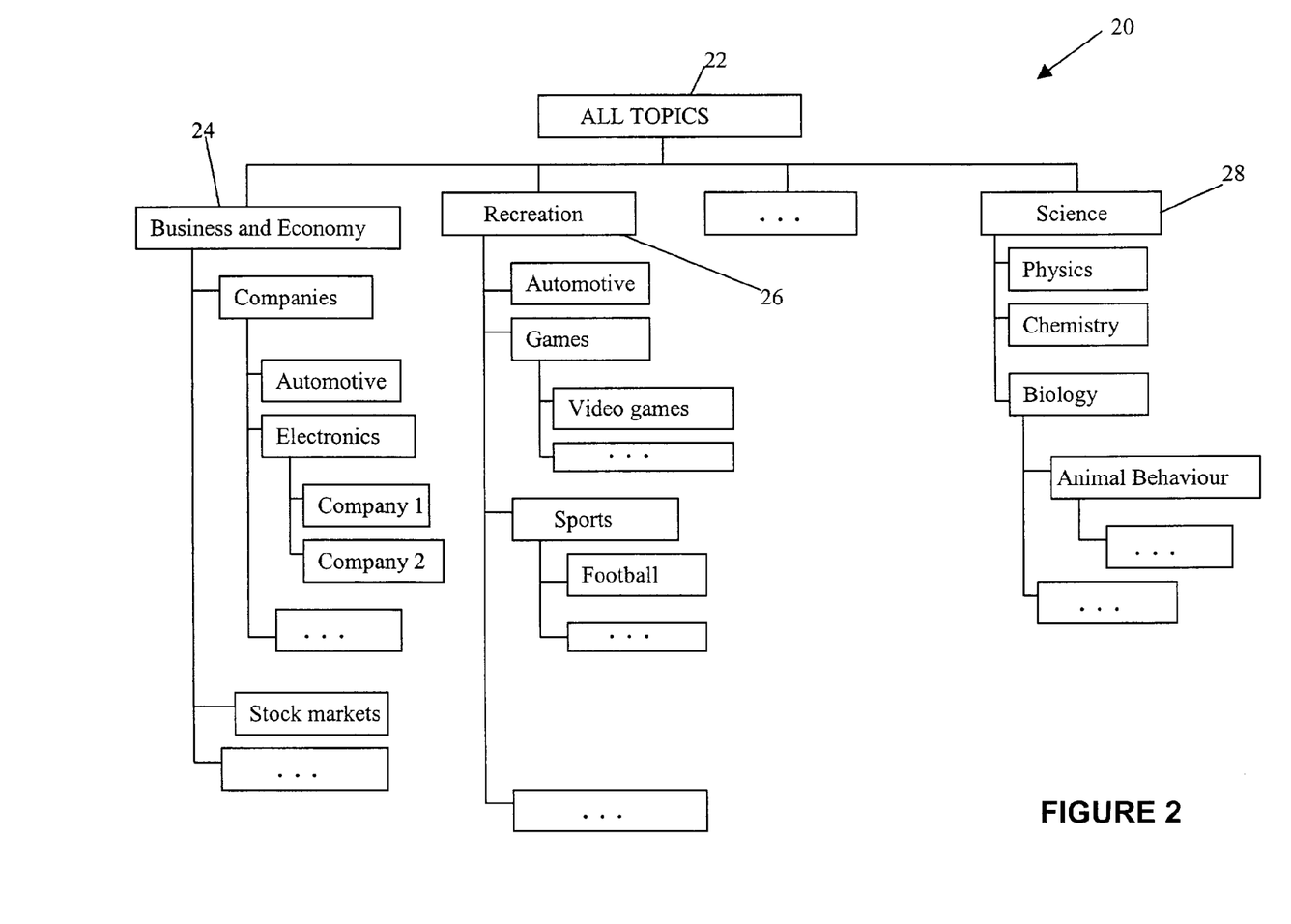
FIG. 2 is a representation of an example topic hiearchy.

While embodiments of the invention may employ any directed acyclic graph hierarchy structure, embodiments are described herein with reference to a tree-like topic hierarchy. An example of a tree-like topic hierarchy for organizing a database of topical documents is shown in FIG. 2. The tree 20 includes a first level comprising a single root node 22 titled "All Topics." A second level of the tree may divide the first level "All Topics" node into several further nodes directed to general topic categories, such as Business and Economy 24, Recreation 26, Science 28, and so forth. Each of the second level nodes may be divided, at the third level, into several further nodes directed to more specific topics within each second level topic. For example, at the third level, the Business and Economy topic 24 may be divided into Companies, Stock Markets, and so forth. Similarly, each of the other second level topics may be divided at the third level to further topics and further levels may be included in the topic hierarchy. The final level of each path in the topic hierarchy is a terminal or leaf node, labeled c in the diagram. The topic hierarchy in the diagram is provided as an example for purposes of simplifying the present disclosure and is not intended to limit the invention to the specific illustration.

According to preferred embodiments of the present invention, a set of classified data items (for example text documents) is available as a starting point before performing the steps of a method according to the invention. If the initial set of data items comprises text documents classified under topic headings, the topic hierarchy may appear as shown in FIG. 2. As another example, if the set of classified data items includes all U.S. patents, a taxonomy which more closely follows the U.S. Patent and Trademark Office classification system might be employed.

Described herein in detail is a supervised classification approach for the automatic population of concept hierarchies, as a particular example of hierarchically organized data items. The method described populates a document hierarchy with new documents. The approach can be used for populating any concept hierarchy where the item to be populated can be defined using a set of classification attributes or a 'feature vector'. The classification attributes provide a set of random variables for which the distribution can be calculated. In particular, a value can be calculated which is representative of the randomness of distribution of the classification attributes of data items within the hierarchy, and the effect on this distribution of adding new data items at various positions in the hierarchy can also be determined.

Generally, techniques for supervised classification of documents have been restricted to assigning a class label to the given document without consideration of the hierarchical organization or the distribution of classification attributes across the hierarchy, and such known techniques are not well suited for populating concept hierarchies. One approach to the problem of classifying documents in a concept hierarchy is to generate a flat (single level) structure by collapsing the hierarchy and treating all the leaf nodes as separate classes. This approach is very rigid and does not allow any change to the concept hierarchy: Moreover, this scheme assumes that the given document can only be assigned the label of any of the leaf nodes of the hierarchy and not of any of its intermediate nodes. Dynamic restructuring of the concept hierarchy is also very difficult using this scheme, as all the documents have to be re-classified with new labels. Therefore the schemes discussed by Andrew McCallum and Kamal Nigam in "A Comparison of Event Models for Naive Bayes Text Classification" (AAAI/ICML-98, Workshop on Learning for Text Categorization, Technical Report WS-98-05, AAAI Press, 1998) and by Kamal Nigam, John Lafferty and Andrew McCallum in "Using Maximum Entropy for Text Classification" (IAJCI-99 Workshop on Machine Learning for Information Filtering, 1999) cannot be efficiently used for the automatic population of concept hierarchies that are frequently changing. For example, directories for the World Wide Web Internet service are still evolving and require frequent changes in their structure.

The method described below can be used for classification in such frequently changing concept hierarchies.

The method of populating predefined concept hierarchies uses the concept of entropy. Entropy characterizes the state of a system, that is of the hierarchically organized set of data items in the present case, in terms of the randomness of distribution of variables of the system. For the method described below, the random variables are classification attributes of data items within the hierarchy. The selected classification attributes are the class labels and words within the set of documents within the document hierarchy. A document to be classified is inserted at the node of the hierarchy that minimises the entropy of the classification attributes for the hierarchy of classified data items. In case the decrease to the entropy is less than a user specified threshold, a new category/sub-category may be created. This provides flexibility of extending the given concept hierarchy with time.

Figure 3:
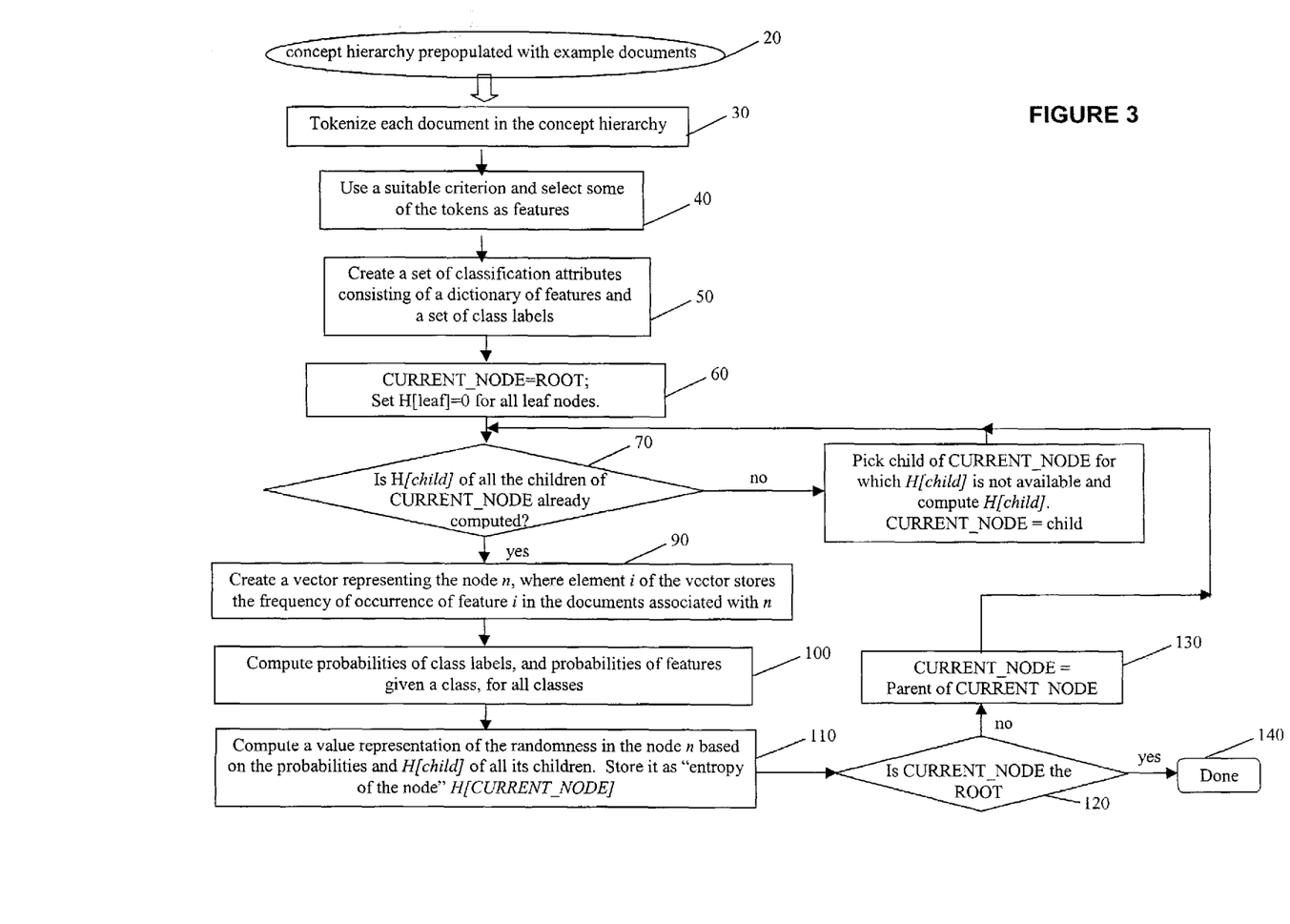
FIG. 3 is a flow diagram showing the steps of a method according to a first embodiment of the invention, for 'training the system' by calculating the initial randomness of distribution of the classification attributes of the data items in the hierarchical set of classified data items.

Referring to FIG. 3, the input to the system is a collection of classified documents within a concept hierarchy, along with their class labels. The system is 'trained' using this collection of documents. Firstly, the method involves tokenizing 30 each document within the collection and using a suitable criterion to select 40 from the input set of documents a set of tokens for use as classification attributes. This set of attributes is hereafter referred to as 'features' of the set of documents. A dictionary D is built 50 which comprises these features.

The selected features could be, for example, all words within each document such that the dictionary is the corpus of words within the entire set of documents. However, to reduce memory space and improve computation speed, it is desirable to only retain in the dictionary words which appear at least a minimum number of times—such as words which appear at least twice (to avoid singleton spelling mistakes), or words which appear in at least 10 different documents. Alternatively, the dictionary could be all words within document abstracts, or a limited set of keywords, or another subset of words chosen according to a feature selection criterion.

Each class then has a collection of classification attributes comprising the class label and the words from the dictionary which appear in documents within that class. The labels and features in the dictionary form the full set of classification attributes of the hierarchical set of documents. Each document's classification attributes are its class label and a subset of the features in the dictionary. Each document can then be represented by the words from dictionary D which occur in the respective document.

The distribution of classification attributes is modelled 60-140 across classes, by using a set of random variables and their values to represent the features in the dictionary, and measuring the probability distributions of the random variables. This model is the state of the system before inserting any new items into the concept hierarchy, and it has an associated initial distribution of classification attributes which can be calculated. Any change to the system due to the insertion of a new item is measured against this model.

Referring once again to FIG. 3, building a mathematical model of the initial concept hierarchy involves:
(a) creating 50 the classification attributes comprising the feature dictionary and a set of class labels (as described above).
(b) using the classification attributes, computing 80-100 the probability distribution of features/words across classes, and the probability distribution of classes themselves. These probability values are used to characterize the random variables for the classification attributes "class labels" and "features/words".
(c) calculating 80-110 an initial entropy value (i.e. a value representative of the randomness of distribution of the classification attributes) at every node of the hierarchy using the random variables defined in 2. This involves calculating 80, 90-110 entropy separately for features within each class and then calculating 100,110 an overall entropy for the node which is a "weighted sum" of the entropy of individual classes and features for each class after applying computed probabilities for the classes and features within each class—i.e. the entropy arising from the frequency of occurrence of features in the documents associated with each class and the distribution of the classes. The entropy of each class is therefore weighted by its probability.
(d) The steps 70-110 described above and shown in FIG. 3 are repeated for each level of the hierarchy, iterating in steps 120-130, using the calculated entropy of child nodes in the calculation of an entropy value for the parent until the entropy result H[CURRENT_NODE] has been calculated for the root node. The process outputs and stores 140 the calculated entropy results for all nodes and this completes the 'training phase'.

Figure 4:
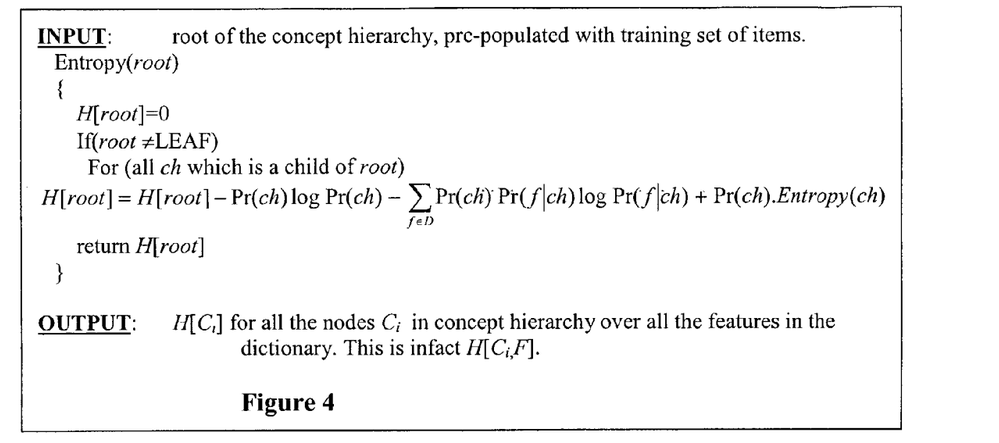
FIG. 4 shows example pseudo code for implementing the 'training phase' of FIG. 3, for calculating the initial randomness of distribution of the classification attributes of the data items in the hierarchical set of classified data items according to an embodiment of the invention.

Steps (c)-(d) above are also shown in FIG. 4 which provides a pseudo code representation of an implementation of the method of FIG. 3 suitable for calculating probabilities and entropy values.

As shown in FIGS. 3 and 4, the main processing steps for computing an entropy value for a node are:
(i) If H[child] (entropy) has been computed for all children of CURRENT_NODE, create 90 a vector representing the node n where element i of the vector stores the frequency of occurrence of feature i in the documents associated with node n.
(ii) Compute 100 the probabilities of each of the classes, where the class labels are the random variables used in the calculation, and compute the probabilities of features within a given class and repeating for all classes.
(iii) Compute 110 a value representing the randomness in the node n based on the probabilities and H[child] of all of the children of node n. This randomness value is stored as the "entropy" of the node H[CURRENT_NODE].

Notation

Before describing the further steps of the method in detail, an explanation of notation will now be provided. In this document, capital letters are used to indicate discrete random variables and lowercase letters to indicate their values. For example, let X be a random variable. The variable X may take values xeX . Here x is the finite set of all possible values for X and is referred to as the alphabet of X.

The probability that X takes on a particular value x is written Pr(X=x), or just Pr(x). Let Y be another random variable. The probability that X=x and Y=y is written Pr(X=x, Y=y), or Pr(x,y) and is referred to as joint probability. The conditional probability that X=x given Y=y is written Pr(X=x|Y=y) or simply Pr(x|y).

The entropy of a random variable is defined in terms of its probability distribution and is a good measure of randomness or uncertainty. Let X be a discrete random variable that can take value $x_1$ from the set $\{x_1, x_2 \ldots x_m\}$ with probability $Pr(x_1)$ such that $$Pr(x_i) \geq 0;\ 1 \leq i \leq m;\ \text{and}$$

$$\sum_{i=1}^{m} Pr(x_i) = 1$$

Entropy takes the probability distribution of X , $\{Pr(x_1), Pr(x_2), \ldots, Pr(x_m)\}$ and returns a real number which measures the uncertainty in the distribution of X. The entropy is indicated as H[X] or $H(Pr(x_1), Pr(x_2), \ldots, Pr(x_m))$ and is defined as follows $$H(Pr(x_1), Pr(x_2), \ldots, Pr(x_m)) = \tag{1}$$

$$H[X] = -\sum_{i=1}^{m} Pr(x_i) \log_2 Pr(x_i)$$

In this document, function logo( ) also refers to $\log_2($ ).

The joint entropy (see D. Feldman, "A Brief Tutorial on: Information Theory, Excess Entropy and Statistical Complexity"), which is a measure of uncertainty associated with joint distribution of a pair of random variables X and Y is given by $$H[X, Y] = -\sum_{x \in \chi} \sum_{x \in Y} Pr(x, y) \log Pr(x, y) \quad (1.1)$$

Similarly, the conditional entropy (see the paper by D. Feldman mentioned earlier), which is a measure of the conditional distribution of X given Y is $$H[X|Y] = -\sum_{x \in \chi} \sum_{x \in Y} Pr(x, y) \log Pr(x|y) \quad (1.2)$$

$$H[X,Y] = H[X] + H[Y|X] \quad (1.3)$$

Entropy of a Concept Hierarchy

The properties of a concept hierarchy are modelled in terms of random variables, so that the state of the concept hierarchy can be recorded in terms of entropy. The model has a realistic relationship to the real world concept hierarchy, since the properties being modelled mainly constitute the classes at every level of the hierarchy and distributions of classification attributes ('features' and 'class labels') across and within classes at all levels. Individual classes are, however, modelled as a bag of features—ignoring the relationship between features and data items.

Let us first consider the case when the concept hierarchy contains only two levels, i.e., a root node and its children. Let there be m children/clusters/classes represented by $c_1, c_2, \ldots, c_m$ and n features in the dictionary $D=\{f_1, f_2, \ldots, f_n\}$. Let F be a rando which can take a value $f_1$ from the dictionary with probability $Pr(f_1)$ and C a random variable which can take a value $c_i$ from the set of class $\zeta = \{c_1, c_2, \ldots, c_m\}$ with probability $Pr(c_i)$.

Now the Entropy of the concept hierarchy H[C,F] can be defined using Equation (1.3) above:

$$H[C,F] = H[C] + H[F|C] = H[F] + H[C|F] \quad (2)$$

as $Pr(x,y) = Pr(x)Pr(y|x) = Pr(y)Pr(x|y)$.

Using Equations (1), (1.1) and (1.2) we can rewrite Equation (2) as:

$$H[C, F] = \quad (2.1)$$
$$-\sum_{c \in \zeta} Pr(c) \log Pr(c) - \sum_{f \in D} \sum_{c \in \zeta} Pr(c) Pr(f|c) \log Pr(f|c)$$

$$H[C, F] = \quad (2.2)$$
$$-\sum_{f \in D} Pr(f) \log Pr(f) - \sum_{c \in \zeta} \sum_{f \in D} Pr(f) Pr(c|f) \log Pr(c|f)$$

Either one of Equations (2.1) and (2.2) can be used to model the entropy of the system. The choice is based on how well the underlying probabilities can be computed. Which of the two equations estimates the corresponding probabilities most accurately and with highest computational efficiency may vary according to the specific problem—in particular according to the number of features versus classes. However, Since very similar results are achieved with both equations, in practice the choice is based on computational efficiency. $N_{cf}$ is used hereafter to denote the number of occurrences of feature f in class c. Similarly $N_c$ is the total count of the number of occurrences of all features in class c (in fact size of class c).

Pr(c) is the probability of a class c occurring. This probability may be computed in terms of the number of documents in that class or even the total count of features in that class. The number of words in a class has been used for calculating the class probabilities in one preferred implementation. If all documents are of equal length, then using either the number of documents or the number of features leads to similar results. In the case of unequal document lengths, one method may perform better than the other depending on the specific document collection.

$$Pr(c) = \left( \frac{N_c}{\sum_{i \in \zeta} N_i} \right)$$

Pr(f) is the probability of finding a feature f while randomly picking up items. Since the classes are modelled as bags of words, then Pr(f) can be computed based on the relative frequency of each feature.

$$Pr(f) = \left( \frac{\sum_{c \in \zeta} N_{cf}}{\sum_{k \in \zeta} \sum_{g \in D} N_{kg}} \right)$$

The conditional probabilities Pr(f|c) and Pr(c|f) can be similarly computed using the frequency of features in classes.

$$Pr(c|f) = \left( \frac{N_{cf}}{\sum_{k \in \zeta} N_{kf}} \right)$$

$$Pr(f|c) = \left( \frac{N_{cf}}{\sum_{g \in D} N_{cg}} \right)$$

The conditional probability Pr(c|f) as defined above are biased towards bigger classes. In such circumstances, the accuracy of classification for smaller classes can be significantly reduced such that the documents which should belong to smaller classes are misclassified into larger classes. In order to avoid this, the counts $N_{cf}$ may be normalized with the size of the class.

$$Pr(c|f) = \left( \frac{\left(\frac{N_{cf}}{N_c}\right)}{\sum_{k \in \zeta} \left(\frac{N_{kf}}{N_k}\right)} \right)$$

Now to extend this model to a concept hierarchy, a number of random variables $C_i$ are needed, which are associated with each node i of the hierarchy and which can take the values of the class labels of their respective children.

$$H[C_l, F] = 0 \quad \text{if nodei is a leaf node} \quad (3)$$

$$H[C_i, F] = H[C_l] + H[F|C_i] + \quad \text{otherwise}$$

$$\sum_{c \in \zeta_i} Pr(c) H[C_c, F]$$

Where $\zeta_i$ is the set of all children of node i.

Figure 7:
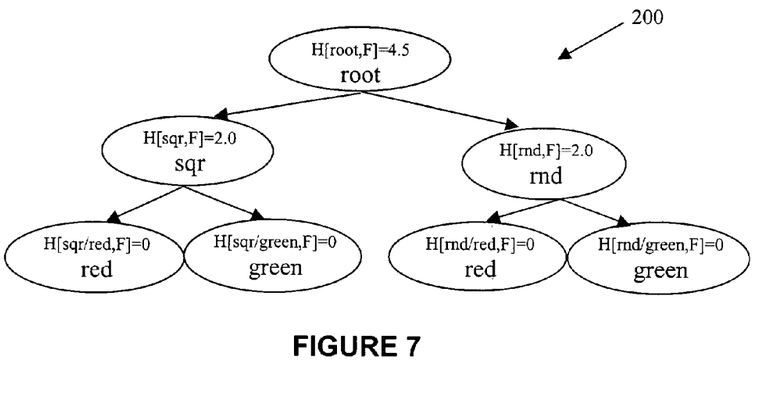
FIG. 7 is a schematic representation of an existing concept hierarchy, with calculated values for the initial randomness of distribution of classification attributes of the data items within each class.

An illustration is shown in FIG. 7. The figure has an example concept hierarchy with 3 levels. The objects inserted into the hierarchy have just 2 features color and shape. Just for the sake of simplicity, it is assumed that feature color can take the values from {red,blue,green} and feature shape can take values from {square,round}. The nodes of the concept hierarchy are also labeled with the value of the most homogenous feature under that node. The probabilties such as Pr(color=red|shape=round) can be easily computed by counting the sample space. The figure also shows the entropies at each node of this concept hierarchy. The entropies are computed using the equations (2.1) and (3).

Entropy for Classification

The entropy of the concept hierarchy as given by (3) can be used to classify previously unseen items into the most relevant category of the concept hierarchy. This is because any addition to the hierarchical set of data items affects the overall entropy of the classification attributes of the set. This affect on entropy can be investigated for all the potential classes in which the new data item could be classified until a class is identified for which addition of the new data item results in the lowest entropy of the overall distribution (relative to the entropy when the data item is added to another class). Since entropy is representative of the uncertainty of distribution of values of a random variable, a lower entropy implies a higher degree of certainty that the data items have been correctly classified. Therefore, the particular class which was identified as the one for which addition of the new data item results in the lowest entropy is selected for classifying the data item.

A naive approach is to insert the new item into every leaf node of the concept hierarchy, one after the other, to measure the resulting entropy and to choose the one which results in the least entropy. This approach should give the optimal classification, but is computationally intensive (a typical concept hierarchy could have a few hundred thousand nodes). Therefore, a simplified method is described below for classifying previously unseen items into the concept hierarchy, which is based on the heuristic that correct classification under a node implies correct classification under all its ancestors. This simplified method provides a satisfactory approximation to the results achieved by measuring the entropy for every leaf node, with far less computation than alternative techniques.

In an initial training phase, entropy is calculated at the root node of the hierarchy, by recursively calculating $H[C_1, F]$ using (3) above. This entropy or disorder is inherent in the given data. Example pseudo-code for use in this training phase is given in FIG. 4.

Having calculated the entropy of the concept hierarchy during the training phase, an attempt is made to minimize the entropy while inserting new items. A top-down approach is followed for classifying the given item into the concept hierarchy, by starting at the root node as shown in the FIG. 7. At every step, the given item is classified under each of the current node's child nodes, one at a time. The entropy conditional on adding the new data item at the current node is calculated, for each of the classes at that level of the hierarchy. This calculation is described below with reference to FIGS. 5 and 6.

The classification which results in minimum entropy is selected as the winning classification. The node of the hierarchy corresponding to the winning classification is marked as the winner node. The difference in the entropies of the winner classification and the next best gives us a measure of confidence in the classification. If the difference is high, then it can be claimed with high confidence that the classification is correct. If the difference is less than some user-defined threshold, either human intervention is sought or the given document is inserted at the current winner node despite low confidence in the selection. The same procedure is repeatedly applied to the winner child until the winner child itself is a leaf node or the system decides to insert the new item into one of the intermediate nodes.

Figure 5:
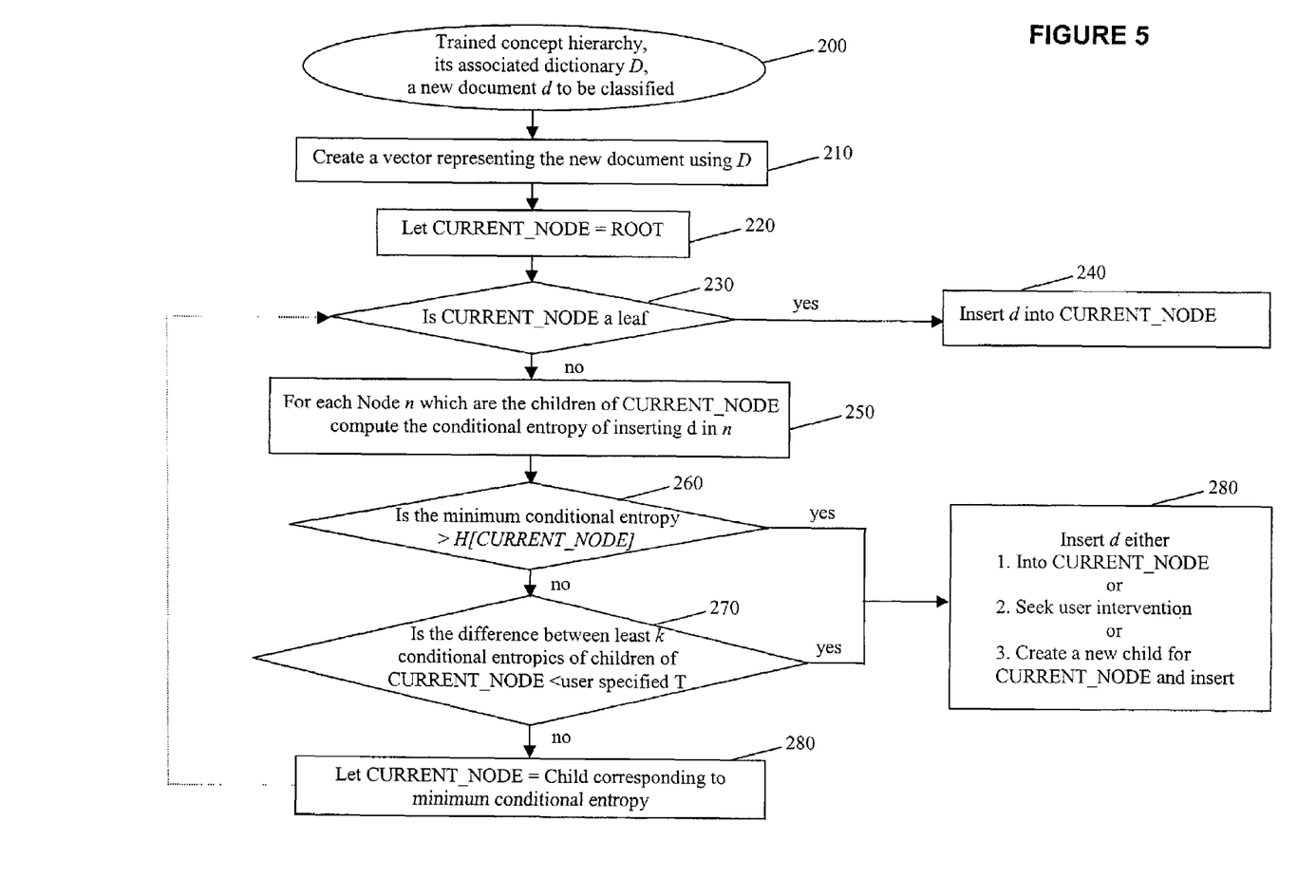
FIG. 5 is a flow diagram showing the steps of a method for classifying a new data item according to an embodiment of the invention.
Figure 6:
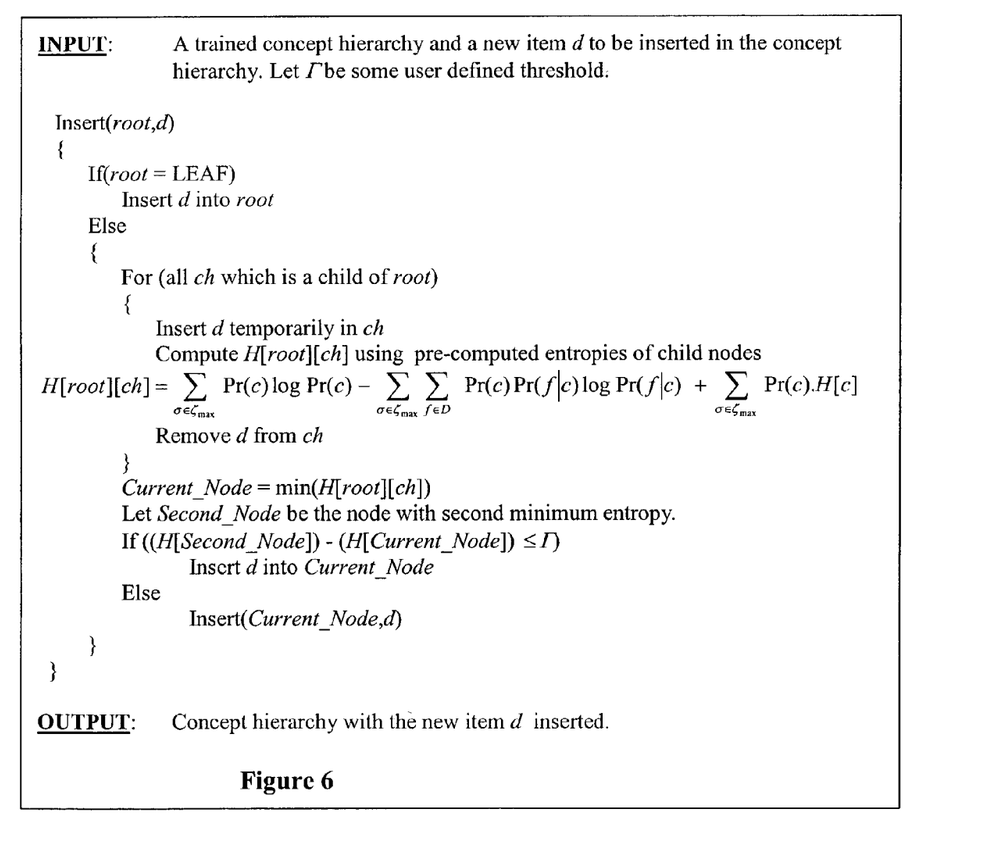
FIG. 6 shows example pseudo code for implementing the steps of FIG. 5 for determining an appropriate class of data items corresponding to a node of the hierarchy, for classifying a new data item according to an embodiment of the invention.

FIG. 5 shows a method for classifying a new data item by identifying the class having a minimum system entropy result, and FIG. 6 shows a pseudocode representation of an implementation of the methiod of FIG. 5.

Referring to FIGS. 5 and 6, the inputs 200 to the method are a trained concept hierarchy and its associated dictionary D and a new data item d which is to be inserted into an appropriate class of the hierarchy of classes.

A vector is created 210 representing the new document using the features within D. Initially, CURRENT_NODE is set 200 to be the root node.

If this root node is determined 230 to be a leaf node of the hierarchy (i.e. the hierarchy has one level) then d is inserted 240 into the root node class. If CURRENT_NODE is not a leaf node, a conditional entropy is computed 250 which is conditional on inserting d in node n, for each node n which is a child of CURRENT_NODE. A comparison of calculated entropy values is carried out to determine 260 whether the minimum conditional entropy is greater than H[CURRENT_ NODE]. If the answer is yes, one of the following options is followed according to the specific implementation:

1. Insert d into CURRENT_NODE;
2. Seek user intervention; or
3. Create a new child for CURRENT_NODE and insert d in the new child node.

However, if the minimum conditional entropy is not greater than H[CURRENT_NODE] the conditional entropies are compared to determine 270 whether the difference between the k lowest value conditional entropies of children of CURRENT_NODE is less than a user specified threshold. (k can take any value from 2 to m where node n has m children). If the answer to this determination is yes, then one of the above options 1-3 is followed (see previous paragraph) according to the specific implementation. If the answer is no, CURRENT_NODE is set 280 to be the child node corresponding to the minimum conditional entropy and processing returns to step 230.

The procedure described herein may not lead to an overall minimal entropy of the hierarchy—the procedure merely seeks to estimate the minimal conditional entropy for each of the children nodes under a current node, and then repeats the estimation for lower levels of the hierarchy, for each new document or other data item. However, the procedure is computationally inexpensive and performs well in practice.

To compute the entropy of the system for all the nodes whenever a new item is populated is unnecessary. The amount of computation can be optimized based on the observation that inserting a new item into any node i changes the probability Pr(f) for the node i and its siblings, where f corresponds to features of the given item. This does not change the entropy of node i, but changes the entropy of the parent of node i. Therefore, the pre-computed entropy of the node i, stored during training, is used while computing the entropy of its parent during the insertion.

Figure 8A:
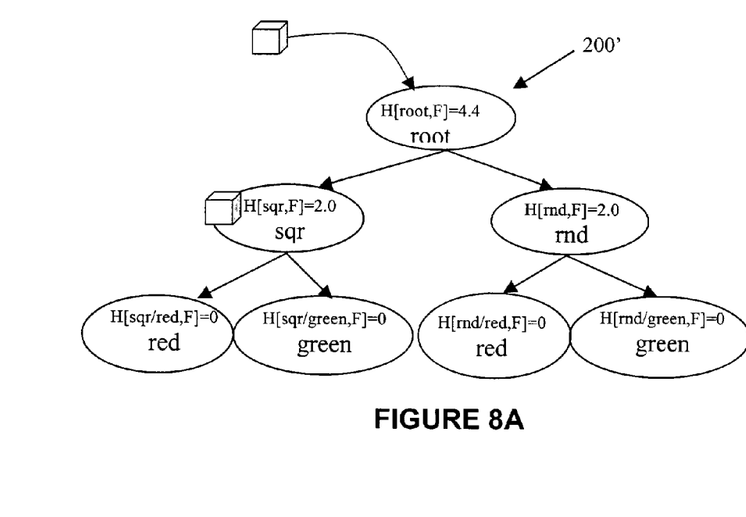
FIGS. 8A and 8B are schematic representations of the concept hierarchy of FIG. 7, showing the effect on entropy resulting from classifying a new data item within one (FIG. 8A) and then the other (FIG. 8B) of two classes at a particular level of the hierarchy.
Figure 8B:
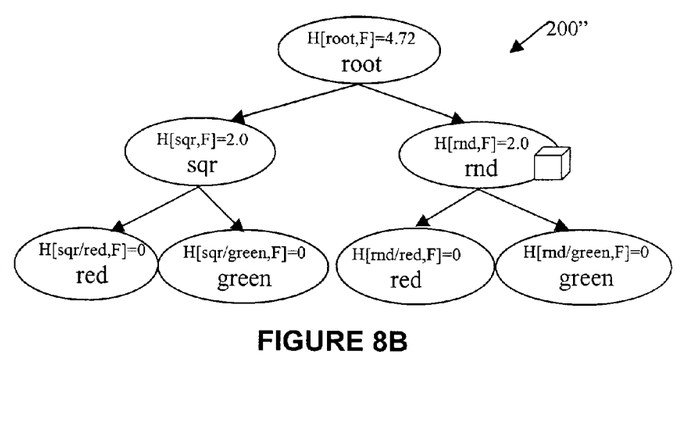

Referring back to the example concept hierarchy of FIG. 7, a step by step illustration of insertion of a new object (a blue cube) is shown with reference to FIG. 8. FIG. 8A shows the change to entropy (from 4.5 to 4.4) at root because of classification of the new object under node "Square" (sqr). Further, FIG. 8B shows the increased entropy (4.72) due to wrong classification under "Round" (rnd). Note that insertion of a blue cube under the node sqr reduces the entropy at the root when compared to the entropy at the root of the training set. This is due to the fact that we only consider the features of the training set while computing the entropy. The blue cube is considered to be a colorless square while inserting.

The node at this level of the hierarchy for which classification yielded the least entropy is chosen as the winner for this stage. The winner node in this example is sqr. The new data item is next inserted under the children of sqr and an attempt is made to find the most appropriate leaf node in the branch of the hierarchy under sqr.

The steps of a method as described above are represented schematically in FIG. 5.

A first step involves creating a dictionary of features (words) for an existing set of classified data items. Classification attributes, as defined above, contain words as well as class labels. The dictionary contains just the words that can serve as classification attributes, but in alternative embodiments of the invention the class labels may also appear in a dictionary. Many alternative methods for extracting suitable classification attributes can be used depending on the type of data. For example, for a document database such as a database of patents, the complete set of all keywords may comprise the dictionary. The classification attributes in this case are the set of all keywords and the set of all class labels.

Once the dictionary has been defined, each document can be classified within the document database according to the respective document's classification attributes, assuming these attributes correspond to the classification attributes of one or more classes of data items in the hierarchy. If there is no such correspondence, a new class may be defined for the data item.

Since the chosen classification attributes can be represented as random variables, the hierarchical set of classified data items can be modelled by reference to the distribution of the classification attributes within the hierarchy. In particular, the pseudo code shown in FIG. 2 is used to calculate a value representative of the randomness of distribution ('entropy') of the classification attributes within this existing hierarchical set of classified data items.

When a new document is to be added to the hierarchy of classified documents, the new document's classification attributes are identified by scanning the set of features making up the dictionary.

Conditional entropy values can now be calculated for each of a plurality of possible classes into which the new data item could be classified. For a first class at a particular level of the hierarchy, a conditional value is calculated which is representative of the randomness of distribution of classification attributes for data items within the set of classified data items, as a condition on the new data item being added to the first class.

This calculation of a conditional entropy value is then repeated for each class at the same level of the hierarchy. The calculated conditional values are compared with each other to identify the lowest conditional value, and then the class having the lowest conditional value is selected for classifying the new data item.

Classification in Two-Level Hierarchies

In the case of a two-level hierarchy, the root node has a set of child nodes and no other descendants. In this case, Equation (3) reduces to Equation (2), which is equivalent to Equation (2.1) or (2.2). Let us denote the original entropy of the system by $H[C,F]$, the new document by x, and the entropy of the system after the new document is placed under the i-th child node by $H_i[C,F]$. The label $c_1$ is assigned to x if $$H_1[C,F] \leq H_j[C,F], \forall j \neq i \quad (4)$$

The above rule is equivalent to assigning the label $c_i$ to x if $$H[C,F] - H_i[C,F] \geq H[C,F] - H_j[C,F], \forall j \neq i$$

Assuming that $H[CF] - H_i[C,F]$ is small, then by treating it as a function of $Pr(c)$, $\forall c \in \psi$, and $Pr(f|c)$, $\forall c \in \psi$, , and, $\forall f \in D$, then, using Taylor's expansion, it can be shown that $$H[C, F] \approx H_i[C, F] + $$
$$\frac{1}{k}\{\log P'(c_i) + H_i[C] - H_i[F|c_i] + \sum_{c_j \in \varphi} P'(c_l)H_i[F|c_l]\}L(x) - $$
$$\frac{L^2(x)}{2K^2}\left[\frac{1 - P'(c_i)}{P'(c_i)}\right] + \frac{P'(c_i)}{K_i}\sum_{f \in D}\{\log(P'(f|c) + H_i[F|c_i]\}x_f - $$
$$\frac{P'(c_i)}{2K_i^2}\left\{\sum \frac{x_f^2}{P(f|c)_{j \in D}} - L^2(x)\right\}$$

In the above equation, $P'(c_i)$ and $P'(f|c)$ are the value of $Pr(c_i)$ and $Pr(f|c)$ after the new document is inserted inder the i-th child, $$K = \sum_{c \in \varphi}\sum_{f \in D} N_{cf}, K_i = \sum_{f \in D} N_{cf}, H_i[C]$$

is the value of $H[C]$ after the new document is inserted under node I, $$H_i[F_i] = \sum_{f \in D} Pr(f|c)\log Pr(f|c), L(x)$$

is the length (total number of words) of x, and $x_f$ is the frequency of occurrence of feature f in x. After omitting terms that are independent of i, the decision rule can be written as follows:

Let $g_i(x) = $ $$\sum_{x_f > 0} x_f \log P'(f|c) + L(x)\log P'(c_i) - \frac{1}{2K_i}\left\{\sum_{x_f > 0} \frac{x_f^2}{P'(f|c)}\right\} - \frac{L(x)^2}{2K}$$

Assign label $c_i$ to x if $g_i(x) \geq g_j(x)$, $\forall j \neq i$

The above rule is fast to compute since the summation is performed over only those words that appear in the new document x, whereas computing (4) requires performing the summation over all words that have a non-zero value for Pr(f|c). Thus, the approximate rule described above can lead to significant cost savings.

While the above description sets out a particular sequence of operational steps for methods embodying the invention, it will be clear to persons skilled in the art that variations of this sequence are also within the scope of the present invention. For example, a plurality of conditional values may be calculated and stored as conditional results of inserting a new data item in each one in turn of the set of classes at a particular level of the hierarchy, and then all of these conditional values can be compared to select the lowest. Alternatively, each time a new conditional value is calculated after the first conditional value for a given level of the hierarchy, the two values can be compared and the higher value discarded—only retaining the lower of the two values since this is a potential winner of the attempt to identify a suitable class for the new data item.

The method described above may alternatively be implemented in dedicated hardware such as one or more integrated circuits performing the functions or sub functions of the method. Such dedicated hardware may include digital signal processors, or one or more microprocessors and associated memories.

INDUSTRIAL APPLICABILITY

It is apparent from the above that the arrangements described are applicable to the data processing industry and to information management for any industry in which data items may be organized hierarchically and new data items require classification when they are added to the hierarchy.

The foregoing describes only some embodiments of the present invention, and modifications and/or changes can be made thereto without departing from the scope and spirit of the invention, the embodiments being illustrative and not restrictive.

For example, the above description includes embodiments which calculate conditional entropy values until a class has been selected at a leaf node of the hierarchy, and embodiments which select an intermediate class. In another alternative embodiment, if the change from an initial entropy value to a conditional entropy value calculated for a selected class at an intermediate level of the hierarchy is less than a defined threshold, the data item can be classified within the selected class without calculating conditional values for descendant nodes.

It will be appreciated by persons skilled in the art that methods according to the present invention may be implemented in software or in hardware circuitry or using a combination of software and hardware components which provide the technical means for implementing the described method steps.

What is claimed is:

1. A computer-implemented method for automating classification of a new data item when adding the new data item to an hierarchically organized hierarchy set of classified data items, wherein nodes of the hierarchy set correspond to classes of data items, said method comprising:

inputting into a computer system classes of documents comprising (i) a collection of classified documents within a hierarchy of classes and (ii) class labels associated with said collection of classified documents;

training said computer system using said collection of classified documents, wherein the training process comprises:

selecting, from an input set of said collection of classified documents, a set of tokens for use as classification attributes; and building a dictionary comprising said classification attributes;

modeling a distribution of said classification attributes across said classes of documents by using a set of random variables and values associated with said set of random variables to represent said classification attributes in said dictionary;

calculating an initial entropy value at every node of each level of said hierarchy of classes using said set of random variables;

inputting into said computer system a new data item to be classified into one of said classes in said hierarchy of classes;

calculating entropy values for each of a plurality of possible classes into which said new data item could be classified;

comparing the calculated entropy values with said initial entropy value at every node of each level of said hierarchy of classes in order to create a plurality of conditional entropy values;

selecting a class having a lowest conditional entropy value; and classifying said new data item in the selected class.

2. The computer-implemented method of claim 1, wherein said classification attributes comprise all words within said each document, wherein said dictionary comprises a corpus of words within an entirety of said input set of said collection of classified documents, and wherein said training process further comprises retaining, in said dictionary, said words appearing at least a minimum number of times in a selected portion of said each document.

3. The computer-implemented method of claim 1, wherein the modeling process further comprises measuring probability distributions of said random variables.

4. The computer-implemented method of claim 3, wherein the measuring process comprises:

computing a probability distribution of said classification attributes across said classes; and computing a probability distribution of said classes.

5. The computer-implemented method of claim 1, wherein the calculating of said initial entropy value comprises:

calculating an entropy separately for said classification attributes within each class;

calculating an overall entropy for said node, wherein said overall entropy comprises a weighted sum of entropies of individual classes and said classification attributes for said each class upon applying computed probabilities for said individual classes and said classification attributes for said each class.

6. The computer-implemented method of claim 1, wherein entropy comprises a value representative of a randomness of distribution of said classification attributes.

7. The computer-implemented method of claim 1, further comprising identifying classification attributes of said new data item based on classification attributes in said dictionary.

8. The computer-implemented method of claim 1, further comprising determining whether said selected class having said lowest conditional value for classifying said new data item is a correct class by comparing said selected class with a class having a next lowest conditional value, wherein a difference between said lowest conditional value and said next lowest conditional value being greater than a user-defined threshold is indicative of said selected class being said correct class.

9. A computer program product comprising program code recorded on a machine-readable recording medium, for controlling the operation of a data processing apparatus on which the program code executes to perform a method for automating classification of a new data item when adding the new data item to an hierarchically organized hierarchy set of classified data items, wherein nodes of the hierarchy set correspond to classes of data items, said method comprising:

inputting into a computer system classes of documents comprising (i) a collection of classified documents within a hierarchy of classes and (ii) class labels associated with said collection of classified documents;

training said computer system using said collection of classified documents, wherein the training process comprises:

selecting, from an input set of said collection of classified documents, a set of tokens for use as classification attributes; and building a dictionary comprising said classification attributes;

modeling a distribution of said classification attributes across said classes of documents by using a set of random variables and values associated with said set of random variables to represent said classification attributes in said dictionary;

calculating an initial entropy value at every node of each level of said hierarchy of classes using said set of random variables;

inputting into said computer system a new data item to be classified into one of said classes in said hierarchy of classes;

calculating entropy values for each of a plurality of possible classes into which said new data item could be classified;

comparing the calculated entropy values with said initial entropy value at every node of each level of said hierarchy of classes in order to create a plurality of conditional entropy values;

selecting a class having a lowest conditional entropy value; and classifying said new data item in the selected class.

10. The computer program product of claim 9, wherein said classification attributes comprise all words within said each document, wherein said dictionary comprises a corpus of words within an entirety of said input set of said collection of classified documents, and wherein said training process further comprises retaining, in said dictionary, said words appearing at least a minimum number of times in a selected portion of said each document.

11. The computer program product of claim 9, wherein in said method, the modeling process further comprises measuring probability distributions of said random variables.

12. The computer program product of claim 9, wherein in said method, the measuring process comprises:

computing a probability distribution of said classification attributes across said classes; and computing a probability distribution of said classes.

13. The computer program product of claim 9, wherein in said method, the calculating of said initial entropy value comprises:

calculating an entropy separately for said classification attributes within each class;

calculating an overall entropy for said node, wherein said overall entropy comprises a weighted sum of entropies of individual classes and said classification attributes for said each class upon applying computed probabilities for said individual classes and said classification attributes for said each class.

14. The computer program product of claim 9, wherein entropy comprises a value reptesentative of a randomness of distribution of said classification attributes.

15. The computer program product of claim 9, wherein said method further comprises identifying classification attributes of said new data item based on classification attributes in said dictionary.

16. The computer program product of claim 9, wherein said method further comprises determining whether said selected class having said lowest conditional value for classifying said new data item is a correct class by comparing said selected class with a class having a next lowest conditional value, wherein a difference between said lowest conditional value and said next lowest conditional value being greater than a user-defined threshold is indicative of said selected class being said correct class.

17. A data processing apparatus for automating classification of a new data item when adding the new data item to an hierarchically organized hierarchy set of classified data items, wherein nodes of the hierarchy set correspond to classes of data items, said data processing apparatus comprising a microprocessor adapted to:

input into a computer system classes of documents comprising (i) a collection of classified documents within a hierarchy of classes and (ii) class labels associated with said collection of classified documents;

train said computer system using said collection of classified documents, wherein the training of said computer system comprises:

selecting, from an input set of said collection of classified documents, a set of tokens for use as classification attributes; and building a dictionary comprising said classification attributes;

model a distribution of said classification attributes across said classes of documents by using a set of random variables and values associated with said set of random variables to represent said classification attributes in said dictionary;

calculate an initial entropy value at every node of each level of said hierarchy of classes using said set of random variables;

input into said computer system a new data item to be classified into one of said classes in said hierarchy of classes;

calculate entropy values for each of a plurality of possible classes into which said new data item could be classified;

compare the calculated entropy values with said initial entropy value at every node of each level of said hierarchy of classes in order to create a plurality of conditional entropy values;

select a class having a lowest conditional entropy value; and classify said new data item in the selected class.

18. The data processing apparatus of claim 17, wherein said classification attributes comprise all words within said each document, wherein said dictionary comprises a corpus of words within an entirety of said input set of said collection of classified documents, and wherein said training process frrther comprises retaining, in said dictionary, said words appearing at least a minimum number of times in a selected portion of said each document.

19. The data processing apparatus of claim 17, wherein the modeling of the distribution of said classification attributes across said classes of documents further comprises measuring probability distributions of said random variables.

20. The data processing apparatus of claim 19, wherein the measuring process comprises:

computing a probability distribution of said classification attributes across said classes; and     computing a probability distribution of said classes.

21. The data processing apparatus of claim 17, wherein the calculation of said initial entropy value comprises:

calculating an entropy separately for said classification attributes within each class;

calculating an overall entropy for said node, wherein said overall entropy comprises a weighted sum of entropies of individual classes and said classification attributes for said each class upon applying computed probabilities for said individual classes and said classification attributes for said each class.

22. The data processing apparatus of claim 17, wherein entropy comprises a value representative of a randomness of distribution of said classification attributes.

23. The data processing apparatus of claim 17, wherein said microprocessor is further adapted to identify classification attributes of said new data item based on classification attributes in said dictionary.

\* \* \* \* \*